United States Patent
Shigemitsu

(10) Patent No.: US 11,240,741 B2
(45) Date of Patent: Feb. 1, 2022

(54) METHOD FOR CONTROLLING DISPLAY DEVICE, DISPLAY DEVICE, AND DISPLAY SYSTEM

(71) Applicant: SEIKO EPSON CORPORATION, Tokyo (JP)

(72) Inventor: Makoto Shigemitsu, Sapporo (JP)

(73) Assignee: Seiko Epson Corporation, Tokyo (JP)

(*) Notice: Subject to any disclaimer, the term of this patent is extended or adjusted under 35 U.S.C. 154(b) by 18 days.

(21) Appl. No.: 16/713,082

(22) Filed: Dec. 13, 2019

(65) Prior Publication Data
US 2020/0196224 A1 Jun. 18, 2020

(30) Foreign Application Priority Data
Dec. 14, 2018 (JP) .............................. JP2018-234119

(51) Int. Cl.
| H04W 48/16 | (2009.01) |
| H04L 29/08 | (2006.01) |
| H04W 4/80 | (2018.01) |
| H04W 76/11 | (2018.01) |
| H04W 72/04 | (2009.01) |
| H04W 84/12 | (2009.01) |

(52) U.S. Cl.
CPC ............ *H04W 48/16* (2013.01); *H04L 67/36* (2013.01); *H04W 4/80* (2018.02); *H04W 72/0413* (2013.01); *H04W 76/11* (2018.02); *H04W 84/12* (2013.01)

(58) Field of Classification Search
CPC ........ H04L 67/36; H04W 48/16; H04W 4/80; H04W 76/11; H04W 84/12; H04W 88/06; H04W 8/005
See application file for complete search history.

(56) References Cited

U.S. PATENT DOCUMENTS

| 2009/0327713 A1* | 12/2009 | Marin | H04L 9/0841 713/168 |
| 2010/0082784 A1* | 4/2010 | Rosenblatt | H04L 12/2812 709/222 |
| 2013/0171940 A1* | 7/2013 | Miki | H04M 1/72412 455/41.2 |
| 2013/0237148 A1* | 9/2013 | McCann | H04W 4/80 455/41.1 |
| 2014/0269660 A1* | 9/2014 | Dunn | H04L 67/125 370/338 |

(Continued)

FOREIGN PATENT DOCUMENTS

| JP | 2004-112225 A | 4/2004 |
| JP | 2017-163489 A | 9/2017 |

*Primary Examiner* — David Bilodeau
(74) *Attorney, Agent, or Firm* — Dority & Manning, P.A.

(57) ABSTRACT

A method for controlling a display device includes: transmitting, in a first status where the display device is not connected to an access point, first status information representing the first status; receiving an instruction to operate as an access point from an electronic device in a status where the first status information is received by the electronic device and where the electronic device is not connected to an access point; operating as a first access point in response to the receiving of the instruction; and transmitting first connection information for connecting to the first access point, to the electronic device, when operating as the first access point.

19 Claims, 8 Drawing Sheets

(56) References Cited

U.S. PATENT DOCUMENTS

| | | | |
|---|---|---|---|
| 2014/0357269 A1* | 12/2014 | Zhou | H04W 76/14 |
| | | | 455/434 |
| 2015/0223145 A1* | 8/2015 | Yoon | H04W 48/04 |
| | | | 370/328 |
| 2016/0360048 A1* | 12/2016 | Yasuma | H04N 1/00251 |
| 2017/0223579 A1* | 8/2017 | Lee | H04W 36/03 |
| 2018/0341442 A1* | 11/2018 | Nagasawa | G06F 3/1238 |
| 2019/0265924 A1* | 8/2019 | Ikeda | G06F 3/1259 |
| 2020/0059834 A1* | 2/2020 | Kim | H04W 36/0072 |

* cited by examiner

METHOD FOR CONTROLLING DISPLAY DEVICE, DISPLAY DEVICE, AND DISPLAY SYSTEM

The present application is based on, and claims priority from JP Application Serial Number 2018-234119, filed Dec. 14, 2018, the disclosure of which is hereby incorporated by reference herein in its entirety.

BACKGROUND

1. Technical Field

The present disclosure relates to a method for controlling a display device, a display device, and a display system.

2. Related Art

JP-A-2004-112225 describes a technique in which devices that can perform both Bluetooth communication and wireless LAN (local area network) communication communicate with each other. Bluetooth is a registered trademark. In this technique, one device acquires various kinds of setting information of wireless LAN communication from the other device via Bluetooth communication and executes wireless LAN communication with the other device, using the setting information.

The technique described in JP-A-2004-112225 is a technique for the devices to exchange various settings of wireless LAN communication with each other. This technique leaves a possibility that the devices may not be able to connect to a preferable access point. Therefore, a technique for reducing the possibility is desired.

SUMMARY

A method for controlling a display device according to an aspect of the present disclosure includes: transmitting, in a first status where the display device is not connected to an access point, first status information representing the first status; receiving an instruction to operate as an access point from an electronic device in a status where the first status information is received by the electronic device and where the electronic device is not connected to an access point; operating as a first access point in response to the receiving of the instruction; and transmitting first connection information for connecting to the first access point, to the electronic device, when operating as the first access point.

A display device according to an aspect of the present disclosure includes: a first communication unit communicating with an electronic device; a second communication unit configured to operate as a first access point; and a control unit controlling the first communication unit and the second communication unit. In a first status where the display device is not connected to an access point, the control unit causes the first communication unit to transmit first status information representing the first status. In a status where the first status information is received by the electronic device and where the electronic device is not connected to an access point, when the first communication unit receives an instruction to operate as an access point from the electronic device, the control unit causes the second communication unit to operate as the first access point. When the second communication unit operates as the first access point, the control unit causes the first communication unit to transmit first connection information for connecting to the first access point, to the electronic device.

A display system according to an aspect of the present disclosure includes: a display device; and an electronic device. In a first status where the display device is not connected to an access point, the display device transmits first status information representing the first status. In a status where the first status information is received by the electronic device and where the electronic device is not connected to an access point, the electronic device transmits an instruction to operate as an access point, to the display device. In response to the receiving of the instruction, the display device operates as a first access point. When operating as the first access point, the display device transmits first connection information for connecting to the first access point, to the electronic device.

A method for controlling a display device according to an aspect of the present disclosure is a method for controlling a display device communicating with an electronic device switching a wireless LAN access point of a connection destination from a second wireless LAN access point that is different from a first wireless LAN access point to the first wireless LAN access point when receiving connection information for connecting to the first wireless LAN access point in a status of being connected to the second wireless LAN access point. The method includes: transmitting the connection information in a status where the display device is connected to the first wireless LAN access point.

DESCRIPTION OF EXEMPLARY EMBODIMENTS

A: First Embodiment

A1: Outline of Display System A

Figure 1:
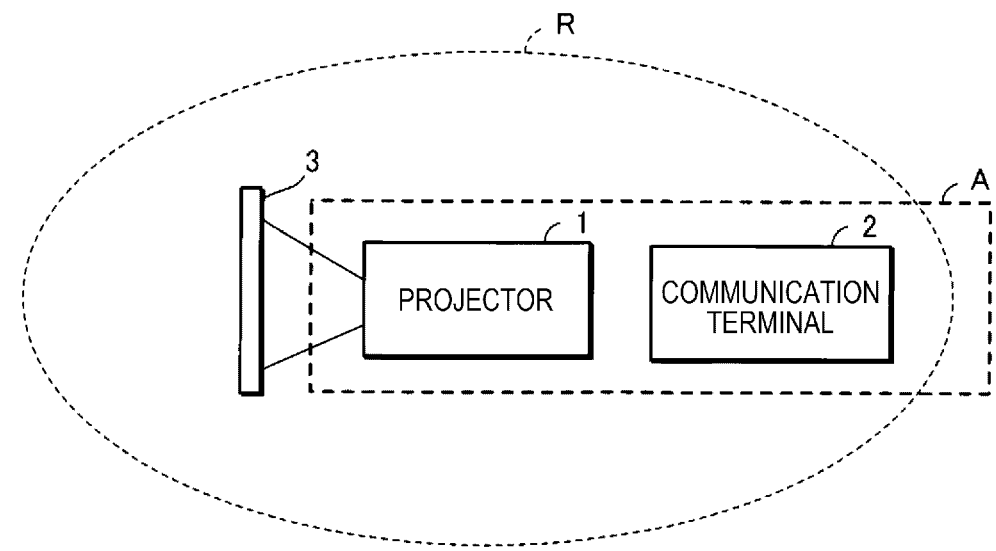
FIG. 1 shows an example of a display system A according to a first embodiment.

FIG. 1 shows an example of a display system A according to a first embodiment. The display system A includes a projector 1 and a communication terminal 2.

The projector 1 and the communication terminal 2 can communicate with each other via Bluetooth communication, more specifically, via BLE (Bluetooth Low Energy) communication. Specifically, when the communication terminal 2 is located within a communication range R for BLE communication of the projector 1, the projector 1 and the communication terminal 2 can execute BLE communication with each other. Bluetooth is a registered trademark. BLE communication is an example of short-range wireless communication. The short-range wireless communication is not limited to Bluetooth communication, more specifically, BLE communication, and may be, for example, infrared communication, ultrasonic communication, or NFC (Near Field Communication) or the like. In this application, it is assumed that the short-range wireless communication does not include wireless LAN communication such as Wi-Fi. The projector 1 and the communication terminal 2 can communicate with each other via wireless LAN (local area network) communication.

The projector 1 projects various images onto a projection surface 3. The projection surface 3 is an example of a display surface. The projector 1 is an example of a display device.

The communication terminal 2 is a mobile communication terminal such as a smartphone or tablet terminal. The communication terminal 2 is carried by a user. The communication terminal 2 is an example of an electronic device and an electronic communication device.

A2: Example of Projector 1

Figure 2:
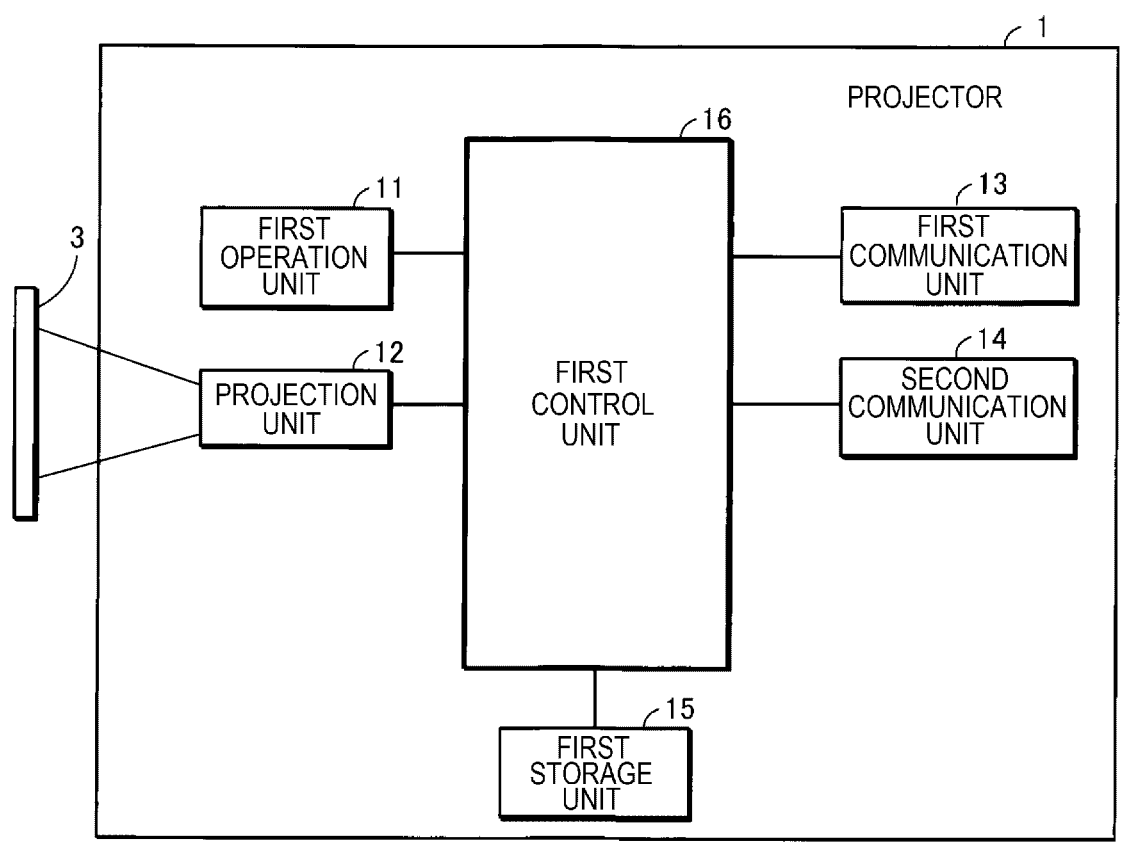
FIG. 2 shows an example of a projector 1.

FIG. 2 shows an example of the projector 1. The projector 1 includes a first operation unit 11, a projection unit 12, a first communication unit 13, a second communication unit 14, a first storage unit 15, and a first control unit 16.

The first operation unit 11 is, for example, various operation buttons or operation keys, or a touch panel. The first operation unit 11 receives an input operation by a user. The first operation unit 11 may be a remote controller or the like transmitting information corresponding to the input operation by the user, wirelessly or via a wire. In this case, the projector 1 has a receiving unit receiving the information transmitted from the remote controller. The remote controller has various operations buttons or operation keys or a touch panel receiving the input operation by the user.

The projection unit 12 projects an image of various kinds onto the projection surface 3 and thus displays the image on the projection surface 3. The image projected by the projection unit 12 is, for example, an image based on image information supplied from the communication terminal 2 or an image supply device not illustrated. The image supply device not illustrated is, for example, a PC (personal computer) or DVD (digital versatile disc) player. The image information is inputted, for example, via the second communication unit 14.

The first communication unit 13 executes BLE communication. For example, the first communication unit 13 communicates directly with the communication terminal 2 via BLE communication.

The second communication unit 14 executes wireless LAN communication, more specifically, Wi-Fi (Wireless Fidelity) communication. Wi-Fi is a registered trademark. The second communication unit 14 has a Wi-Fi Direct function. Therefore, the second communication unit 14 can operate as an access point. The access point means a wireless LAN access point. Hereinafter, the access point that can be operated by the second communication unit 14 is referred to as a "first access point". Wi-Fi Direct is a registered trademark.

The first storage unit 15 includes, for example, a flash memory, a ROM (read-only memory), and a RAM (random-access memory). The first storage unit 15 is an example of a computer-readable recording medium. The first storage unit 15 stores various kinds of information and a program prescribing the operation of the first control unit 16.

The first control unit 16 is a computer such as a CPU (central processing unit). The first control unit 16 may be formed of one or a plurality of processing devices. The first control unit 16 is an example of a control unit. The first control unit 16 reads and executes the program stored in the first storage unit 15 and thus controls the projection unit 12, the first communication unit 13, and the second communication unit 14.

A3: Example of Communication Terminal 2

Figure 3:
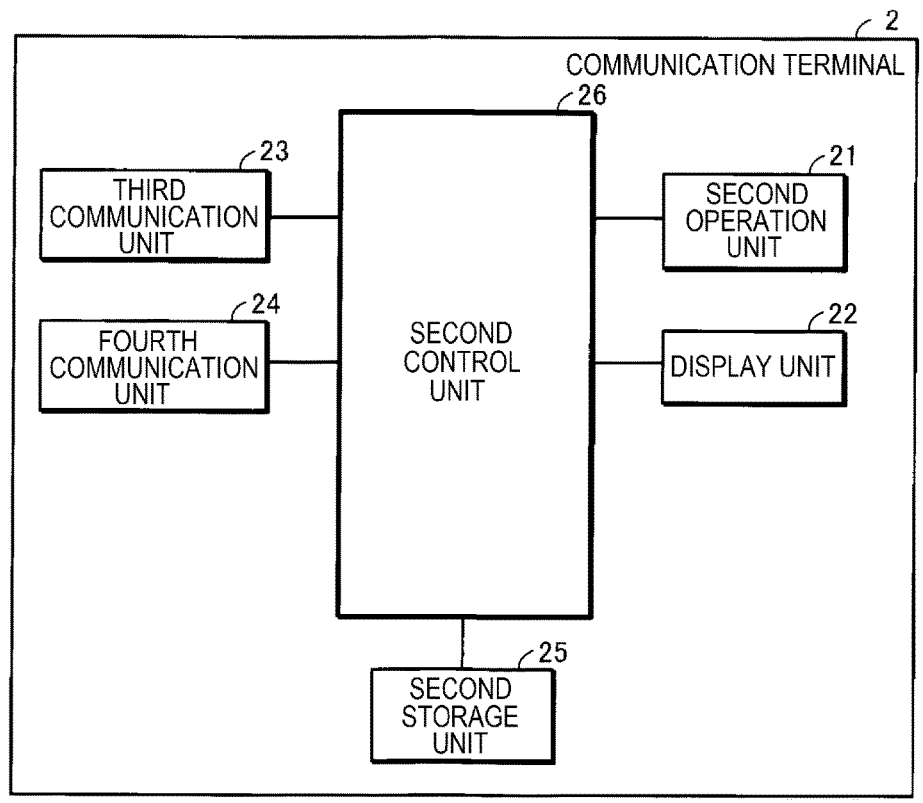
FIG. 3 shows an example of a communication terminal 2.

FIG. 3 shows an example of the communication terminal 2. The communication terminal 2 includes a second operation unit 21, a display unit 22, a third communication unit 23, a fourth communication unit 24, a second storage unit 25, and a second control unit 26.

The second operation unit 21 is, for example, various operation buttons or operation keys, or a touch panel. The second operation unit 21 receives an input operation by a user.

The display unit 22 is a liquid crystal display panel. However, the display unit 22 is not limited to the liquid crystal display panel and may be, for example, an organic EL display panel.

The third communication unit 23 executes communication of the same type as the communication used by the first communication unit 13 of the projector 1. In this embodiment, the third communication unit 23 executes BLE communication, similarly to the first communication unit 13.

The fourth communication unit 24 can communicate with the second communication unit 14 of the projector 1. In this embodiment, the fourth communication unit 24 executes Wi-Fi communication.

The second storage unit 25 includes, for example, a flash memory, a ROM, and a RAM. The second storage unit 25 is an example of a computer-readable recording medium. The second storage unit 25 stores various kinds of information and a program prescribing the operation of the second control unit 26.

The second control unit 26 is, for example, a computer such as a CPU. The second control unit 26 may be formed of one or a plurality of processing devices. The second control unit 26 reads and executes the program stored in the second storage unit 25 and thus controls the display unit 22, the third communication unit 23, and the fourth communication unit 24.

A4: Example of Projection Unit 12

Figure 4:
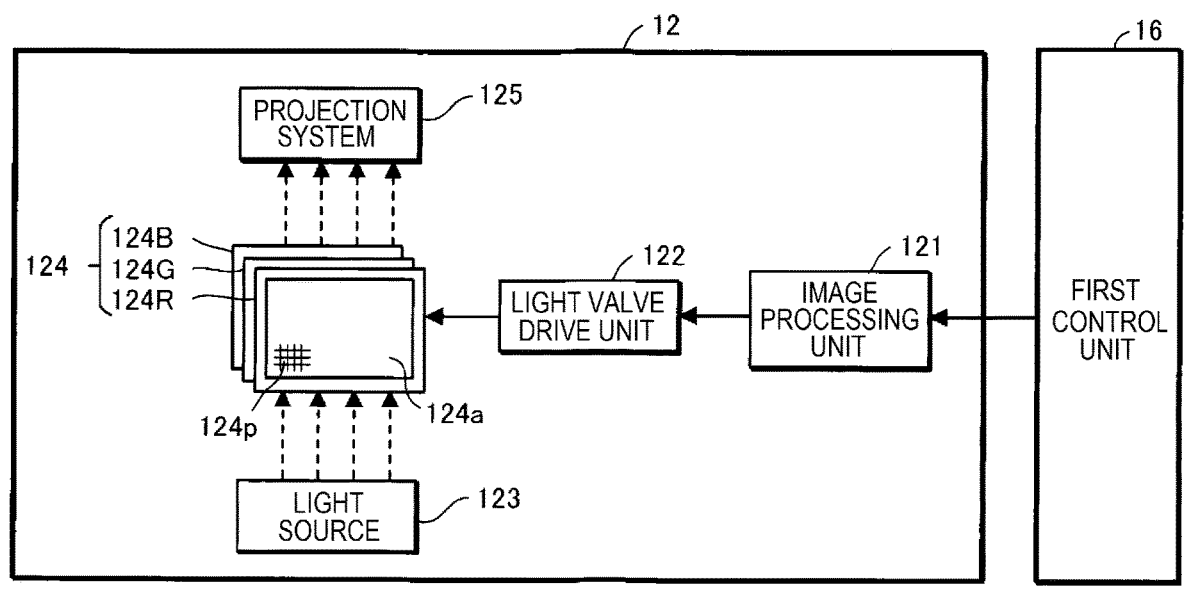
FIG. 4 shows an example of a projection unit 12.

FIG. 4 shows an example of the projection unit 12 of the projector 1. The projection unit 12 includes an image processing unit 121, a light valve drive unit 122, a light source 123, a liquid crystal light valve for red 124R, a liquid crystal light valve for green 124G, a liquid crystal light valve for blue 124B, and a projection system 125. Hereinafter, when the liquid crystal light valve for red 124R, the liquid crystal light valve for green 124G, and the liquid crystal light valve for blue 124B need not be discriminated from each other, these are referred to as the "liquid crystal light valve 124".

The image processing unit 121 is, for example, a computer such as a CPU. The image processing unit 121 may be formed of one or a plurality of processing devices. The image processing unit 121 performs, for example, image processing of image information provided from the communication terminal 2 and thus generates an image signal.

The image processing executed by the image processing unit 121 includes, for example, resolution conversion processing. In the resolution conversion processing, the image processing unit 121 converts the resolution of the image information, for example, into the resolution of the liquid crystal light valve 124. The image processing unit 121 may execute other image processing, for example, gamma correction processing, in addition to or instead of the resolution conversion processing.

The light valve drive unit 122 drives the liquid crystal light valve 124, based on the image signal inputted from the image processing unit 121.

The light source 123 is, for example, an LED (light-emitting diode). However, the light source 123 is not limited to the LED and may be, for example, a xenon lamp, ultra-high-pressure mercury lamp, or laser light source or the like. The light emitted from the light source 123 is reduced in unevenness in the luminance distribution by an optical integration system, not illustrated, and is subsequently separated into color light components of red, green, and blue, which are the primary colors of light, by a color separation system, not illustrated. The red color light component becomes incident on the liquid crystal light valve for red 124R. The green color light component becomes incident on the liquid crystal light valve for green 124G. The blue color light component becomes incident on the liquid crystal light valve for blue 124B.

The liquid crystal light valve 124 is formed of a liquid crystal panel or the like having a pair of transparent substrates with a liquid crystal arranged between them. The liquid crystal light valve 124 has a rectangular pixel area 124a including a plurality of pixels 124p located into a matrix. In the liquid crystal light valve 124, a drive voltage is applied to the liquid crystal at each pixel 124p. When the light valve drive unit 122 applies a drive voltage based on the image signal to each pixel 124p, each pixel 124p is set to a light transmittance based on the drive voltage. The light emitted from the light source 123 is modulated by passing through the pixel area 124a and thus forms an image based on the image signal, corresponding to each color light. The liquid crystal light valve 124 is an example of a light modulation device.

The images of the respective colors are combined together at each pixel 124p by a light combining system, not illustrated, and thus form a color image. The color image is projected onto the projection surface 3 by the projection system 125.

A5: Explanation of Operation

Figure 5:
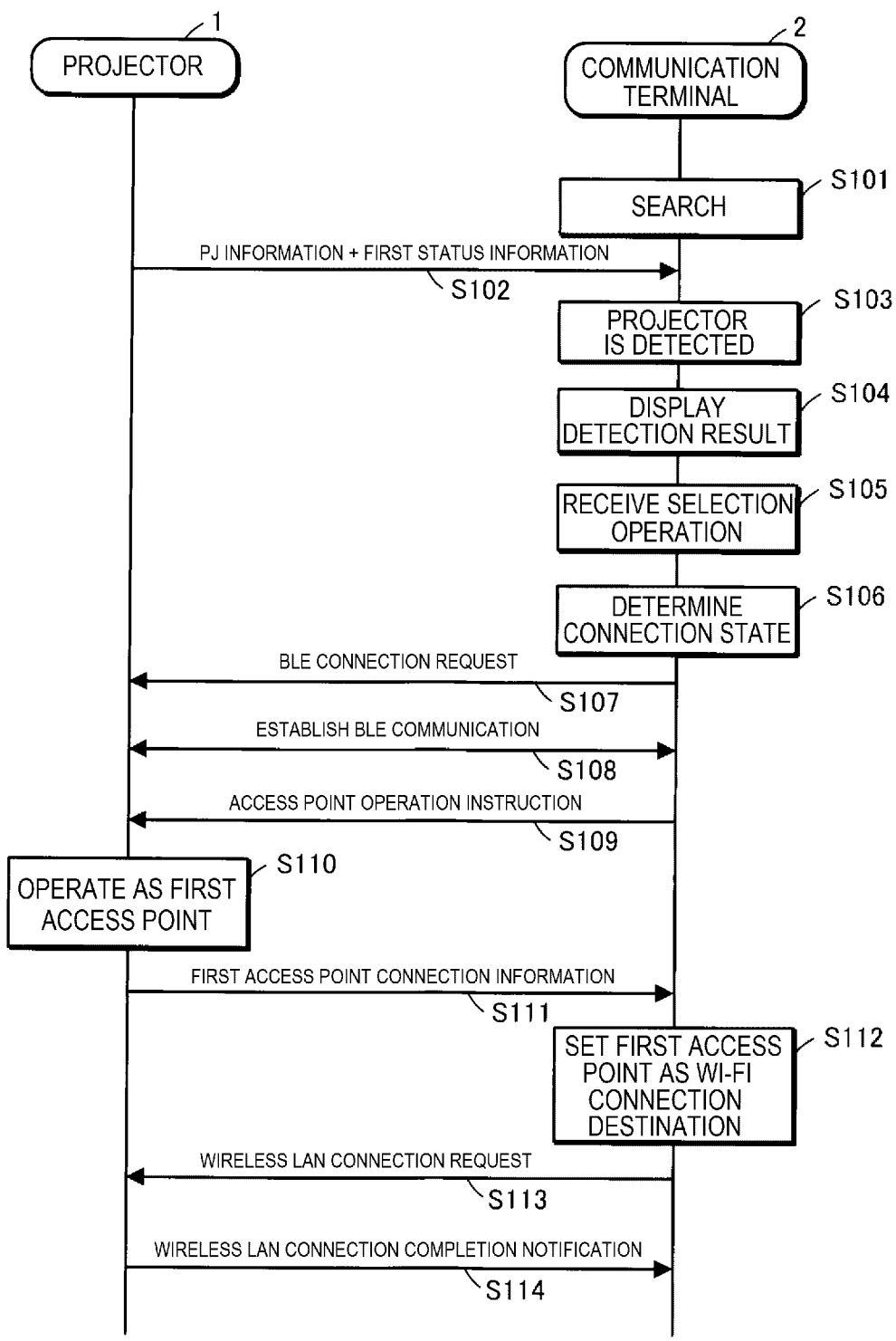
FIG. 5 is a sequence chart for explaining an operation of the display system A in a status where both the projector 1 and the communication terminal 2 are unconnected to an access point.

A5-1: Both the projector 1 and the communication terminal 2 are unconnected to an access point FIG. 5 is a sequence chart for explaining an operation of the display system A in a status where both the projector 1 and the communication terminal 2 are unconnected to an access point.

In step S101, the second control unit 26 of the communication terminal 2 searches for the projector 1, using the third communication unit 23. Specifically, in step S101, the second control unit 26 causes the first communication unit 13 to receive advertisement information that is wirelessly transmitted by the projector 1 via BLE communication from the first communication unit 13 in step S102.

In a first status where the projector 1 is not connected to any access point, the first control unit 16 causes the first communication unit 13 to transmit advertisement information including information of the projector 1 and first status information representing the first status by broadcasting via BLE communication. In FIG. 5, the information of the projector 1 is expressed as "PJ information".

Here, the information of the projector 1 includes the name of the projector 1, regardless of whether the projector 1 is connected to an access point or not.

When the projector 1 is connected to an access point, the information of the projector 1 includes the SSID (Service Set Identifier) of the access point connected with the projector 1 and a password necessary for connecting to the access point connected with the projector 1. The SSID of the access point is an example of identification information of the access point.

In the first status, that is, in the status where the projector 1 is not connected to any access point, when the user carrying the communication terminal 2 is not located within the communication range R of BLE communication of the projector 1 and the third communication unit 23 does not receive the advertisement information wirelessly transmitted by broadcasting from the projector 1, the second control unit 26 ends step S101.

Meanwhile, in the first status, when the user carrying the communication terminal 2 is located within the communication range R of BLE communication of the projector 1, the advertisement information wirelessly transmitted by broadcasting from the projector 1 reaches the communication terminal 2. When the third communication unit 23 of the communication terminal 2 receives the advertisement information transmitted from the projector 1, the second control unit 26 in step S103 determines that the projector 1 is detected.

As the projector 1 is detected, the second control unit 26 in step S104 causes the display unit 22 to display the information of the projector 1 included in the advertisement information.

Figure 6:
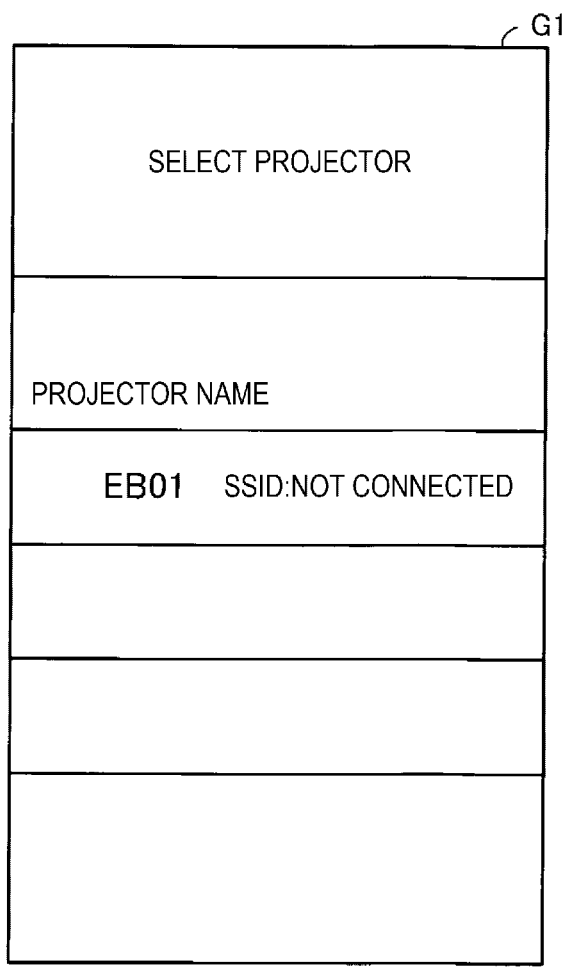
FIG. 6 shows a display example G1 of information of the projector 1.

FIG. 6 shows a display example G1 of the information of the projector 1 at the display unit 22. FIG. 6 shows a display example where the projector 1 has a name "EB01". At the display unit 22, the SSID of the access point to which the projector 1 is connected is displayed along with the name "EB01" of the projector 1. In the operation shown in FIG. 5, the projector 1 is not connected to an access point and the communication terminal 2 receives the first status information. Therefore, in the example shown in FIG. 6, "Not connected" is displayed as the SSID of the access point to which the projector 1 is connected.

Subsequently, when the user carrying the communication terminal 2 performs, on the second operation unit 21, a selection operation to select the "EB01" displayed at the display unit 22, that is, the projector 1, the second operation unit 21 receives the selection operation in step S105.

As the second operation unit 21 receives the selection operation, the second control unit 26 in step S106 determines the connection state with an access point, of each of the projector 1 selected by the selection operation and the communication terminal 2.

In step S106, when the advertisement information received from the projector 1 includes the first status information, that is, when the first status information is received by the communication terminal 2, the second control unit 26 determines that the projector 1 is not connected to an access point.

In step S106, the second control unit 26 also determines whether the communication terminal 2 is connected to an access point or not, based on the connection state between the fourth communication unit 24 and an access point.

In the example shown in FIG. 5, the first status information is received by the communication terminal 2, and the communication terminal 2 is not connected to an access point, as described above. In this case, the second control unit 26 performs connection processing for BLE communication with the projector 1 and subsequently in step S107 causes the third communication unit 23 to transmit a connection request for BLE communication to the projector 1. Thus, BLE communication between the communication terminal 2 and the projector 1 is established in step S108.

Subsequently, in step S109, the second control unit 26 causes the third communication unit 23 to transmit an access point operation instruction to operate as an access point, to the projector 1 via BLE communication. The access point operation instruction is an example of an instruction.

When the first communication unit 13 of the projector 1 receives the access point operation instruction, the first control unit 16 in step S110 causes the second communication unit 14 to operate as a first access point.

The projector 1 may discriminate whether to cause the second communication unit 14 to operate as the first access point or not, in the form of an operation mode. For example, the projector 1 may be provided with a first mode as an operation mode in which the second communication unit 14 is made to operate as the first access point, and a second mode as an operation mode in which the second communication unit 14 is not made to operate as the first access point. In this case, the first control unit 16 switches the operation mode from the second mode to the first mode in step S110.

Subsequently, in step S111, the first control unit 16 causes the first communication unit 13 to transmit first access point connection information for connecting to the first access point, to the communication terminal 2. The first access point connection information includes the SSID of the first access point and a password necessary for connecting to the first access point. The first access point connection information is an example of first connection information.

When the third communication unit 23 of the communication terminal 2 receives the first access point connection information, the second control unit 26 in step S112 sets the first access point as the connection destination of the fourth communication unit 24, that is, the connection destination of Wi-Fi communication.

Subsequently, in step S113, the second control unit 26 causes the fourth communication unit 24 to transmit a wireless LAN communication connection request including the first access point connection information, to the projector 1.

When the second communication unit 14 of the projector 1, that is, the first access point, receives the wireless LAN communication connection request, the first control unit 16 executes connection processing for wireless LAN communication between the first access point and the fourth communication unit 24 in response to the wireless LAN communication connection request.

Figure 7:
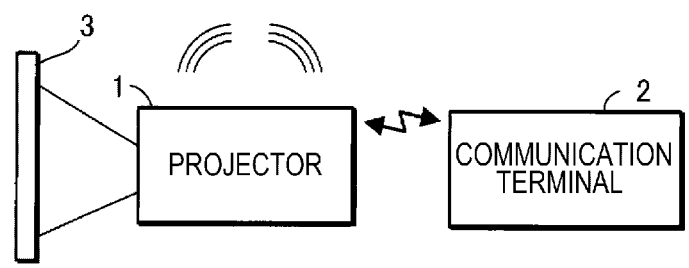
FIG. 7 shows a state where wireless LAN communication between the projector 1 and the communication terminal 2 is established via a second communication unit 14 serving as a first access point.

On completion of the connection processing for wireless LAN communication by the first control unit 16, the first control unit 16 in step S114 causes the second communication unit 14, that is, the first access point, to transmit a wireless LAN connection completion notification to the communication terminal 2. The fourth communication unit 24 of the communication terminal 2 receives the wireless LAN connection completion notification. Thus, wireless LAN communication is established. FIG. 7 shows the state where wireless LAN communication between the projector 1 and the communication terminal 2 is established, with the projector 1, more specifically, the second communication unit 14, serving as the first access point.

In the projector 1 and the method for controlling the projector 1 according to this embodiment, in the first status, the first control unit 16 causes the first communication unit 13 to transmit the advertisement information including the first status information.

When the first communication unit 13 receives the access point operation instruction transmitted from the communication terminal 2 in the status where the first status information is received by the communication terminal 2 and where the communication terminal 2 is not connected to an access point, the first control unit 16 causes the second communication unit 14 to operate as the first access point.

When causing the second communication unit 14 to operate as the first access point, the first control unit 16 causes the first communication unit 13 to transmit the first access point connection information to the communication terminal 2.

Therefore, when establishing wireless LAN connection between the projector 1 and the communication terminal 2 in the status where both the projector 1 and the communication terminal 2 are unconnected to an access point, the communication terminal 2 can be connected to the first access point of the projector 1. In this case, the communication terminal 2 can be connected to the first access point even when the first access point connection information is not inputted from the user. Therefore, the first access point of the projector 1 is a preferable access point as the connection destination of the communication terminal 2. Thus, in the status where both the projector 1 and the communication terminal 2 are unconnected to an access point, the communication terminal 2 can be connected to a preferable access point.

The first status information, the access point operation instruction, and the first access point connection information are communicated via short-range wireless communication. Therefore, using the short-range wireless communication enables wireless LAN communication via an access point.

On receiving the first access point connection information, the communication terminal 2 connects to the first access point, using the first access point connection information. Therefore, in the status where both the projector 1 and the communication terminal 2 are unconnected to an access point, the communication terminal 2 can be connected to a preferable access point.

The first access point connection information includes the SSID of the first access point and the password necessary for connecting to the first access point. Therefore, the communication terminal 2 can be connected to the first access point where the password is set.

Figure 8:
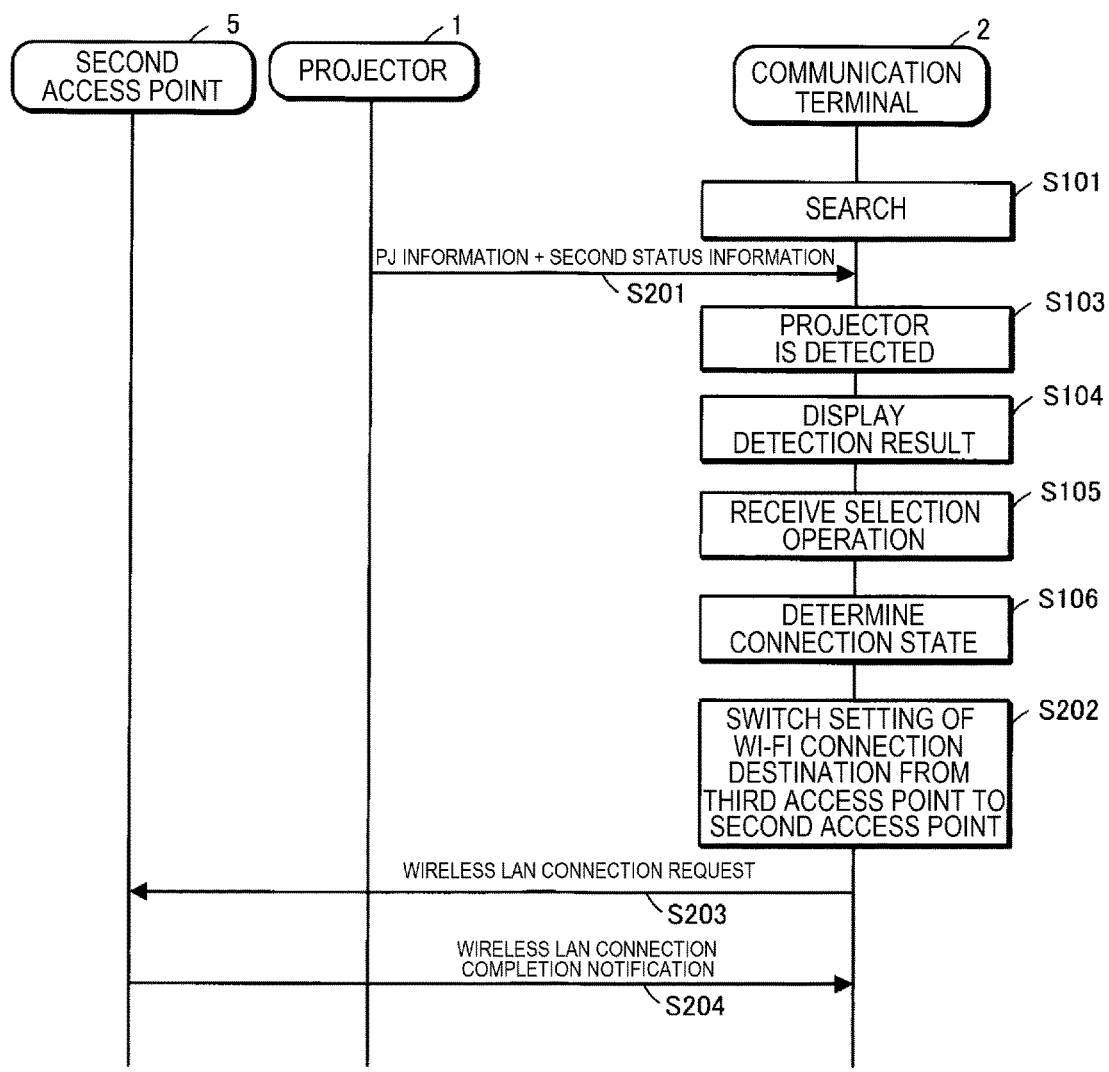
FIG. 8 is a sequence chart for explaining an operation of the display system A in a status where the projector 1 and the communication terminal 2 are connected to different access points from each other.

A5-2: Both the Projector 1 and the Communication Terminal 2 are already Connected to an Access Point FIG. 8 is a sequence chart for explaining an operation of the display system A in a status where the projector 1 and the communication terminal 2 are connected to different access points from each other. In FIG. 8, the same processing as in FIG. 5 is denoted by the same reference signs.

Figure 9:
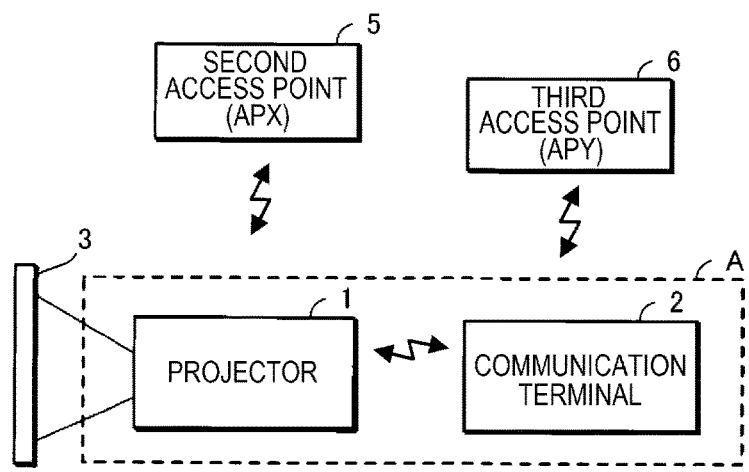
FIG. 9 shows the status where the projector 1 and the communication terminal 2 are connected to different access points from each other.

Hereinafter, it is assumed that the projector 1 is connected to a second access point 5 and that the communication terminal 2 is connected to a third access point 6, as illustrated in FIG. 9. It is assumed that the SSID of the second access point 5 is "APX" and that the SSID of the third access point 6 is "APY". The second access point 5 is different from the first access point. The third access point 6 is different from each of the first access point and the second access point 5. Hereinafter, of the operation shown in FIG. 8, processing that is different from the processing shown in FIG. 5 is mainly described.

In a second status where the projector 1 is connected to the second access point 5, the first control unit 16 in step S201 causes the first communication unit 13 to transmit advertisement information including information of the projector 1 and second status information representing the second status, by broadcasting via BLE communication. Then, steps S103 to S106 are executed.

Here, since the projector 1 is connected to the second access point 5, the information of the projector 1 transmitted in step S201 includes the SSID of the second access point 5 and a password necessary for connecting to the second access point 5. The SSID of the second access point 5 and the password necessary for connecting to the second access point are an example of second connection information for connecting to the second access point 5.

Figure 10:
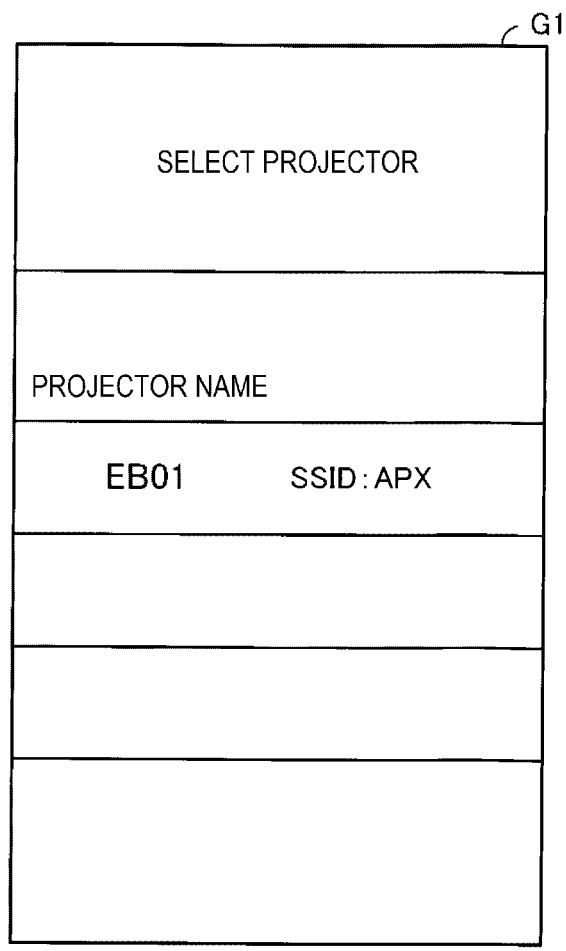
FIG. 10 shows a display example of information of the projector 1.

In step S104, for example, a screen illustrated in FIG. 10 is displayed at the display unit 22. In step S105, the second operation unit 21 receives a selection operation to select the projector 1. In step S106, the second control unit 26 determines that the projector 1 is connected to the second access point 5 and that the communication terminal 2 is connected to the third access point 6, since the second status information is received by the communication terminal 2 and the communication terminal 2 is connected to the third access point 6.

Subsequently, since the second status information is received by the communication terminal 2 and the communication terminal 2 is connected to the third access point 6, the second control unit 26 in step S202 switches the setting of the Wi-Fi communication connection destination of the fourth communication unit 24 from the third access point 6 to the second access point 5.

Subsequently, in step S203, the second control unit 26 causes the fourth communication unit 24 to transmit a wireless LAN communication connection request including the SSID of the second access point 5 and the password necessary for connecting to the second access point 5, to the second access point 5.

On receiving the wireless LAN communication connection request, the second access point 5 executes connection processing for wireless LAN communication between the second access point 5 and the fourth communication unit 24 in response to the wireless LAN communication connection request from the communication terminal 2.

Figure 11:
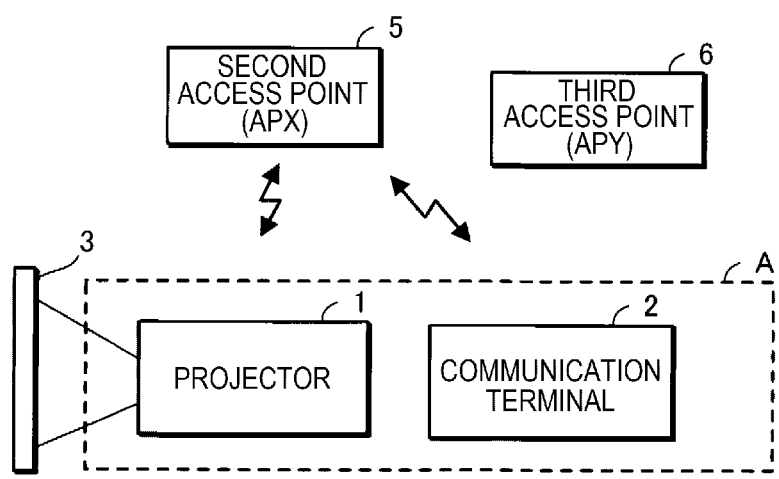
FIG. 11 shows a state where both the projector 1 and the communication terminal 2 have established wireless LAN communication with a second access point 5.

On completion of the connection processing for wireless LAN communication with the communication terminal 2, the second access point 5 in step S204 transmits a wireless LAN connection completion notification to the communication terminal 2. The fourth communication unit 24 of the communication terminal 2 receives the wireless LAN connection completion notification. Thus, wireless LAN communication is established. FIG. 11 shows the state where both the projector 1 and the communication terminal 2 have established wireless LAN communication with the second access point 5.

As described above, in the second status, the first control unit 16 causes the first communication unit 13 to transmit the advertisement information including the information for connecting to the second access point 5.

Therefore, on receiving the advertisement information transmitted from the first communication unit 13, the communication terminal 2 can switch the access point of the connection destination from the third access point 6 to the second access point 5, to which the projector 1 is connected. In this case, the communication terminal 2 can be connected to the second access point 5 even when the information for connecting to the second access point 5 is not inputted from the user. Therefore, the second access point 5 is a preferable access point as the connection destination of the communication terminal 2. Thus, in the status where the projector 1 and the communication terminal 2 are connected to different access points from each other, the communication terminal 2 can be connected to a preferable access point. The second access point 5 is an example of a first wireless LAN access point. The third access point 6 is an example of a second wireless LAN access point.

The information for connecting to the second access point 5 is communicated via short-range wireless communication. Therefore, using the short-range wireless communication enables wireless LAN communication via an access point.

When the communication terminal 2 receives the information for connecting to the second access point 5 in a third status where the communication terminal 2 is connected to the third access point 6, the communication terminal 2 switches the access point of the connection destination from the third access point 6 to the second access point 5, using the information for connecting to the second access point 5.

Therefore, in the status where the projector 1 and the communication terminal 2 are connected to different access points from each other, the communication terminal 2 can be connected to a preferable access point.

The information for connecting to the second access point 5 includes the SSID of the second access point 5 and the password necessary for connecting to the second access point 5. Therefore, the communication terminal 2 can be connected to the second access point 5 where the password is set.

Figure 12:
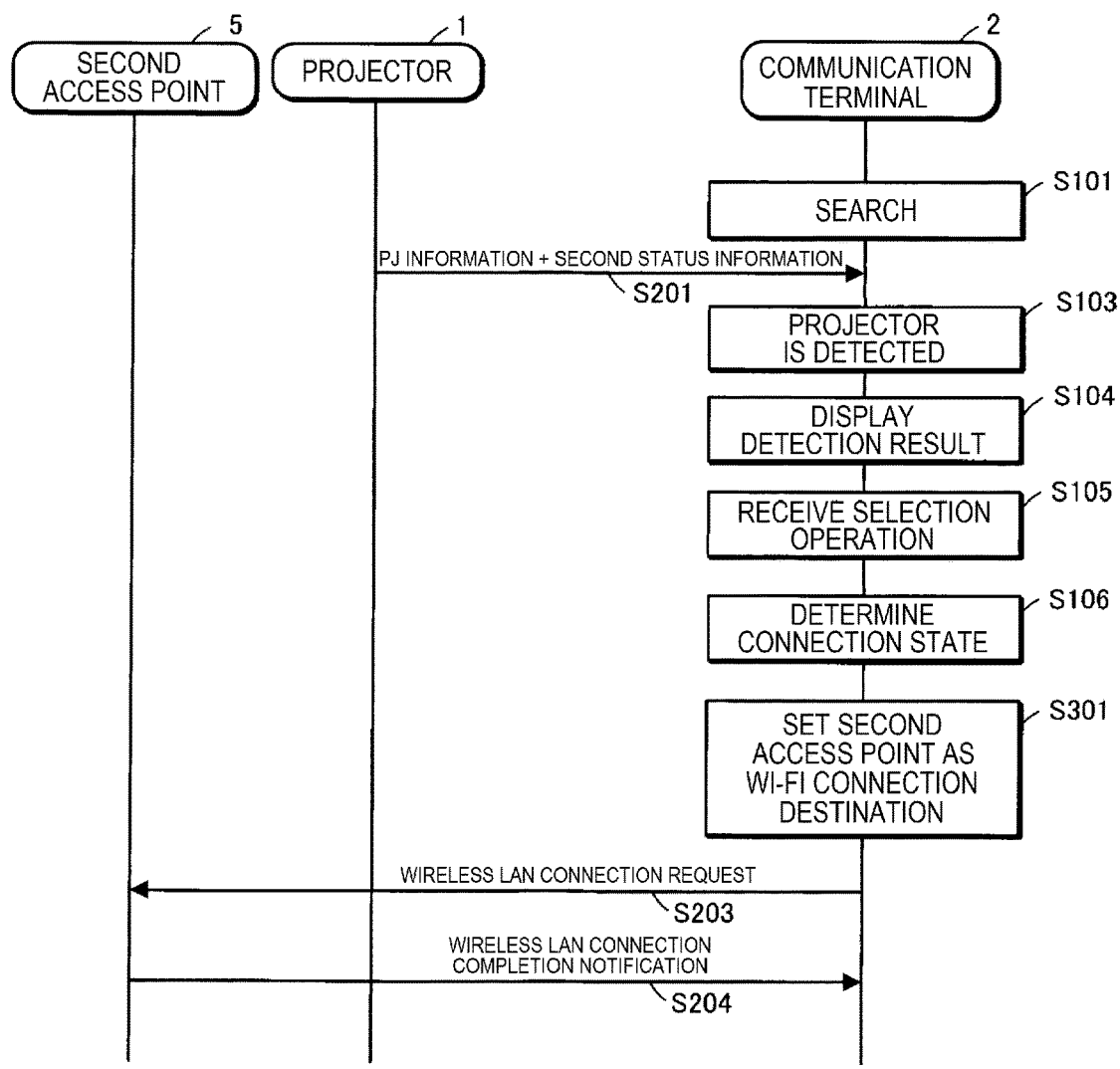
FIG. 12 is a sequence chart for explaining an operation of the display system A in a status where only the projector 1 is connected to an access point.

A5-3: Of the Projector 1 and the Communication Terminal 2, only the Projector 1 is already Connected to an Access Point FIG. 12 is a sequence chart for explaining an operation of the display system A in a status where, of the projector 1 and the communication terminal 2, only the projector 1 is connected to an access point. In FIG. 12, the same processing as in FIG. 8 is denoted by the same reference signs.

Figure 13:
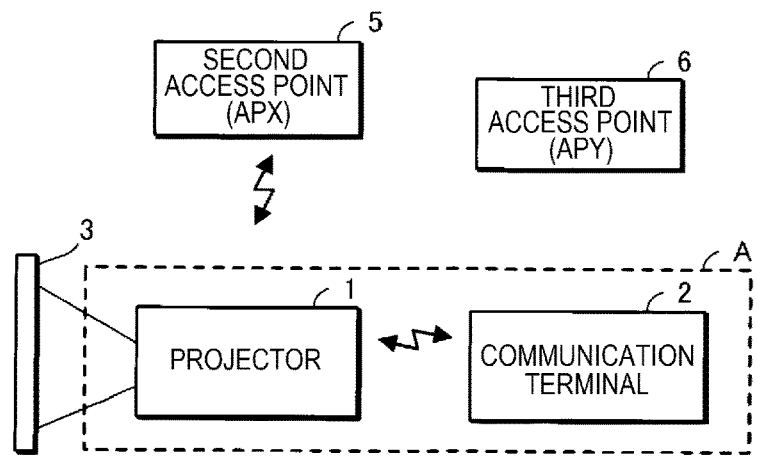
FIG. 13 shows the status where only the projector 1 is connected to an access point.

It is now assumed that the projector 1 is connected to the second access point 5 and that the communication terminal 2 is not connected to any access point, as illustrated in FIG. 13. Hereinafter, of the operation shown in FIG. 12, processing that is different from the processing shown in FIG. 8 is mainly described.

In step S106, the second control unit 26 determines that the projector 1 is connected to the second access point 5 and that the communication terminal 2 is not connected to any access point, since the second status information is received by the communication terminal 2 and the fourth communication unit 24 is not connected to any access point.

Figure 14:
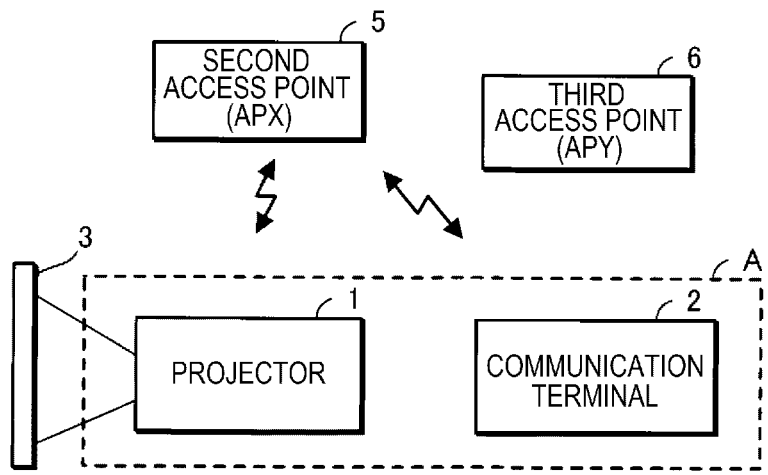
FIG. 14 shows a state where both the projector 1 and the communication terminal 2 have established wireless LAN communication with the second access point 5.

Subsequently, since the second status information is received by the communication terminal 2 and the communication terminal 2 is not connected to any access point, the second control unit 26 in step S301 sets the second access point 5 as the connection destination of the fourth communication unit 24. Then, steps S203 and S204 are executed. FIG. 14 shows the state where both the projector 1 and the communication terminal 2 have established wireless LAN communication with the second access point 5.

As described above, the communication terminal 2 can be connected to the second access point 5 even when the information for connecting to the second access point 5 is not inputted from the user. Therefore, the second access point 5 is a preferable access point as the connection destination of the communication terminal 2. Thus, in the status where, of the projector 1 and the communication terminal 2, only the projector 1 is connected to an access point, the communication terminal 2 can be connected to a preferable access point.

Figure 15:
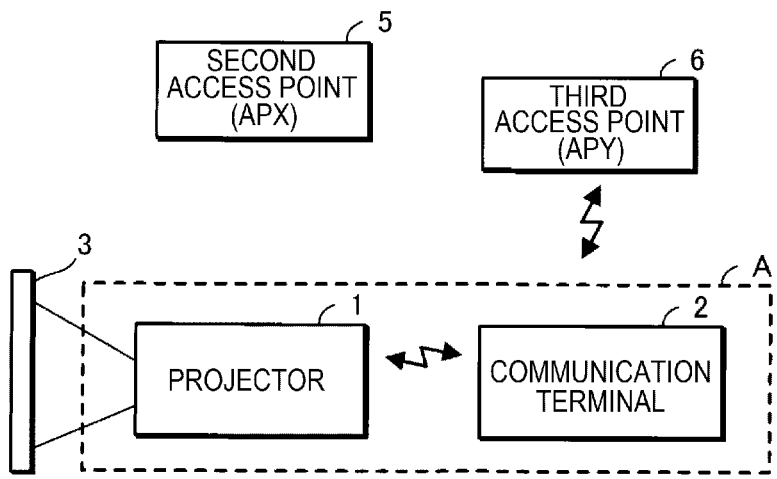
FIG. 15 shows a status where only the communication terminal 2 is connected to an access point.
Figure 16:
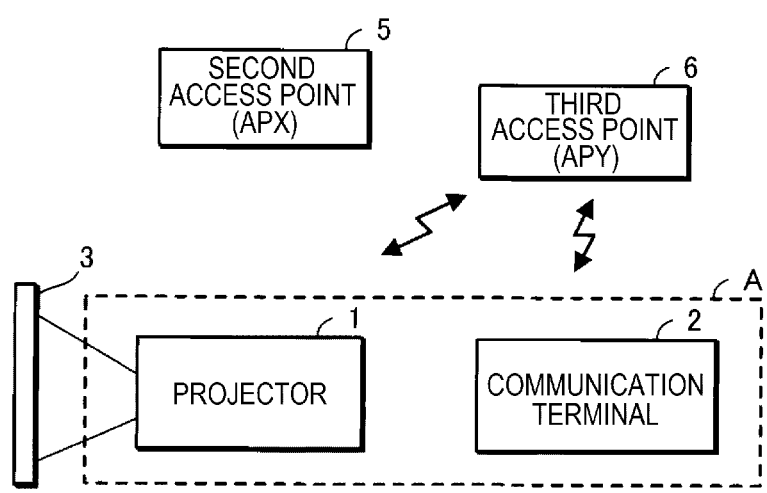
FIG. 16 shows a state where both the projector 1 and the communication terminal 2 have established wireless LAN communication with a third access point 6.

A5-4: Of the projector 1 and the Communication Terminal 2, only the Communication Terminal 2 is already Connected to an Access Point As shown in FIG. 15, when, of the projector 1 and the communication terminal 2, only the communication terminal 2 is already connected to an access point, the access point to which the projector 1 can be connected is the access point to which the communication terminal 2 is connected.

Therefore, the user inputs to the projector 1 a password necessary for connecting to the third access point 6, to which the communication terminal 2 is connected. The projector 1 is thus connected to the third access point 6. FIG. shows the state where both the projector 1 and the communication terminal 2 have established wireless LAN communication with the third access point 6.

B: Modification Examples

In the first embodiment, for example, the following configurations may be employed.

B1: Modification Example 1

In the first embodiment, the projector 1 may generate a QR code representing the information transmitted via BLE communication and display the QR code at a display, not illustrated. The QR code is a registered trademark. In this case, the communication terminal 2 may read the QR code displayed by the projector 1 and thus receive the information transmitted via BLE communication from the projector 1 in the first embodiment. The communication terminal 2 may also generate a QR code representing the information transmitted via BLE communication and display the QR code at the display unit 22. In this case, the projector 1 may read the QR code displayed by the communication terminal 2 and thus receive the information transmitted via BLE communication from the communication terminal 2 in the first embodiment. Displaying the QR code means transmitting visible light showing the QR code.

B2: Modification Example 2

Although the liquid crystal light valve 124 is used as an example of the light modulation device in the first embodiment and modification example 1, the light modulation device is not limited to the liquid crystal light valve and can be changed according to need. For example, the light modulation device may have a configuration using three reflection-type liquid crystal panels. The light modulation device may also have such a configuration as a system using one liquid crystal panel, a system using three digital mirror devices (DMDs), or a system using one digital mirror device. When only one liquid crystal panel or DMD is used as the light modulation device, components equivalent to the color separation system and the light combining system are not needed. Other than the liquid crystal panel and the DMD, any configuration that can modulate the light emitted from the light source 123 can be employed as the light modulation device.

B3: Modification Example 3

In one of the first embodiment and modification examples 1 and 2, each of the first control unit 16, the second control unit 26, and the image processing unit 121 may be implemented by hardware including an electronic circuit, for example, an FPGA (field-programmable gate array) or ASIC (application-specific IC).

B4: Modification Example 4

In one of the first embodiment and modification examples 1 to 3, the projector 1 is used as the display device, but the display device may be a direct-view display such as a liquid crystal display device or EL display device.

B5: Modification Example 5

In one of the first embodiment and modification examples 1 to 4, when the communication terminal 2 receives the second connection information for connecting to the second access point 5 in the third status where the communication terminal 2 is connected to the third access point 6, the communication terminal 2 may connect to the access point with a faster transfer speed, of the second access point 5 and the third access point 6.

For example, when connecting to the third access point 6, the communication terminal 2 receives information representing the transfer speed of the third access point 6 from the third access point 6.

The second connection information for connecting to the second access point 5 includes the SSID of the second access point 5, the password necessary for connecting to the second access point 5, and information representing the transfer speed of the second access point 5.

The communication terminal 2 specifies the access point with a faster transfer speed, of the second access point and the third access point 6, using the information representing the transfer speed of the third access point 6 and the information representing the transfer speed of the second access point 5.

Subsequently, the communication terminal 2 connects to the access point with a faster transfer speed, of the second access point 5 and the third access point 6.

What is claimed is:

1. A method for controlling a display device, the method comprising:
   determining whether the display device is connected to any external access point,
   transmitting, in a first status where the display device is determined not to be connected to any external access point, first status information representing the first status to an electronic device;
   receiving an instruction to operate as a first access point from an electronic device when the first status information is received by the electronic device and the electronic device is not connected to any external access point;
   operating as the first access point in response to the receiving of the instruction; and
   transmitting first connection information for connecting to the first access point, to the electronic device, when operating as the first access point.

2. The method for controlling the display device according to claim 1, wherein
the first status information, the instruction, and the first connection information are communicated via short-range wireless communication.

3. The method for controlling the display device according to claim 1, wherein
the electronic device connects to the first access point, using the first connection information, in response to the receiving of the first connection information.

4. The method for controlling the display device according to claim 1, wherein
the first connection information includes identification information of the first access point and a password necessary for connecting to the first access point.

5. The method for controlling the display device according to claim 1, further comprising:
transmitting, in a second status where the display device is connected to a second access point different from the first access point, second connection information for connecting to the second access point.

6. The method for controlling the display device according to claim 5, wherein
the second connection information is communicated via short-range wireless communication.

7. The method for controlling the display device according to claim 5, wherein
when the electronic device receives the second connection information in a third status where the electronic device is connected to a third access point different from both of the first access point and the second access point, the electronic device switches an access point of a connection destination from the third access point to the second access point, using the second connection information.

8. The method for controlling the display device according to claim 5, wherein
when the electronic device receives the second connection information in a third status where the electronic device is connected to a third access point different from both of the first access point and the second access point, the electronic device connects to an access point with a faster transfer speed, of the second access point and the third access point.

9. The method for controlling the display device according to claim 5, wherein
the second connection information includes identification information of the second access point and a password necessary for connecting to the second access point.

10. A display device comprising:
a first communication unit configured to communicate with an electronic device;
a second communication unit configured to operate as a first access point; and
a central processing unit (CPU) configured to control the first communication unit and the second communication unit, wherein
the display device is configured to determine whether the display device is connected to any external access point,
in a first status where the display device is determined not to be connected to any external access point, the CPU causes the first communication unit to transmit first status information representing the first status to the electronic device,
when the first status information is received by the electronic device and the electronic device is not connected to any external access point, the first communication unit receives an instruction to operate as the first access point from the electronic device, and the CPU causes the second communication unit to operate as the first access point, and
when the second communication unit operates as the first access point, the CPU causes the first communication unit to transmit first connection information for connecting to the first access point, to the electronic device.

11. The display device according to claim 10, wherein
the first status information, the instruction, and the first connection information are communicated via short-range wireless communication.

12. The display device according to claim 10, wherein
the electronic device connects to the first access point, using the first connection information, in response to the receiving of the first connection information.

13. The display device according to claim 10, wherein
the first connection information includes identification information of the first access point and a password necessary for connecting to the first access point.

14. The display device according to claim 10, wherein
in a second status where the display device is connected to a second access point different from the first access point, the CPU causes the first communication unit to transmit second connection information for connecting to the second access point.

15. The display device according to claim 14, wherein
the second connection information is communicated via short-range wireless communication.

16. The display device according to claim 14, wherein
when the electronic device receives the second connection information in a third status where the electronic device is connected to a third access point different from both of the first access point and the second access point, the electronic device switches from the third access point to the second access point, using the second connection information.

17. The display device according to claim 14, wherein
when the electronic device receives the second connection information in a third status where the electronic device is connected to a third access point different from both of the first access point and the second access point, the electronic device connects to an access point with a faster transfer speed, of the second access point and the third access point.

18. The display device according to claim 14, wherein
the second connection information includes identification information of the second access point and a password necessary for connecting to the second access point.

19. A display system comprising:
a display device; and
an electronic device, wherein
the display device is configured to determine whether the display device is connected to any external access point,
the electronic device is configured to determine whether the electronic device is connected to any external access point,
in a first status where the display device is determined not to be connected to any external access point, the display device transmits first status information representing the first status to the electronic device,
where when the first status information is received by the electronic device and the electronic device is determined not to be connected to any external access point, the electronic device transmits an instruction to operate as a first access point, to the display device, in response to the receiving of the instruction, the display device operates as the first access point, and when operating as the first access point, the display device transmits first connection information for connecting to the first access point, to the electronic device.

\* \* \* \* \*